(12) United States Patent
Beaurepaire et al.

(10) Patent No.: US 8,870,462 B2
(45) Date of Patent: Oct. 28, 2014

(54) BEARING BUSH

(75) Inventors: Olivier Beaurepaire, Rumilly (FR); Omar Mian, Rugby (GB)

(73) Assignees: MAHLE International GmbH, Stuttgart (DE); MAHLE Engine Systems UK Limited, Rugby, Warwickshire (GB)

( * ) Notice: Subject to any disclaimer, the term of this patent is extended or adjusted under 35 U.S.C. 154(b) by 190 days.

(21) Appl. No.: 13/578,354

(22) PCT Filed: Feb. 11, 2011

(86) PCT No.: PCT/EP2011/000658
§ 371 (c)(1),
(2), (4) Date: Mar. 8, 2013

(87) PCT Pub. No.: WO2011/098290
PCT Pub. Date: Aug. 18, 2011

(65) Prior Publication Data
US 2013/0209013 A1    Aug. 15, 2013

(30) Foreign Application Priority Data
Feb. 11, 2010 (GB) .................................. 1002309.1

(51) Int. Cl.
*F16C 9/04* (2006.01)
*F16C 33/10* (2006.01)

(52) U.S. Cl.
USPC .......................................... 384/294; 384/291

(58) Field of Classification Search
USPC ................ 384/288, 291, 294; 74/579 R, 595; 123/197.3; 92/187
See application file for complete search history.

(56) References Cited

U.S. PATENT DOCUMENTS

| 1,921,044 | A | * | 8/1933 | Sparrow ........................ 384/286 |
| 6,872,004 | B2 | * | 3/2005 | Mian et al. .................... 384/288 |
| 8,322,929 | B2 | * | 12/2012 | Issler ............................ 384/286 |
| 2002/0126924 | A1 | | 9/2002 | Okamoto et al. |
| 2007/0165974 | A1 | | 7/2007 | Foster et al. |
| 2008/0115621 | A1 | | 5/2008 | McEwan |
| 2008/0152271 | A1 | | 6/2008 | Barlerin et al. |
| 2008/0166077 | A1 | | 7/2008 | Chou |
| 2008/0247692 | A1 | | 10/2008 | Schroeder |
| 2009/0078080 | A1 | | 3/2009 | Kemnitz et al. |
| 2009/0123097 | A1 | | 5/2009 | Barlerin et al. |

FOREIGN PATENT DOCUMENTS

| DE | 10 2007 023 107 | 11/2008 |
| WO | WO 2008/010805 | 1/2008 |

OTHER PUBLICATIONS

International Search Report of PCT/EP2011/000658, Jun. 27, 2011.
Written Opinion of the International Searching Authority in PCT/EP2011/000658, Jun. 27, 2011.
British Search Report dated Jun. 10, 2010 in GB Application No. 1002309.1.

* cited by examiner

*Primary Examiner* — Thomas R. Hannon
(74) *Attorney, Agent, or Firm* — Collard & Roe, P.C.

(57) ABSTRACT

A bearing bush is described wherein the bush bore at the axial ends of the bush is provided with relieved portions extending at least a part of the distance around a circumference of the bush, the relieved portions being in the form of grooves in the bore surface.

14 Claims, 3 Drawing Sheets

BEARING BUSH

CROSS REFERENCE TO RELATED APPLICATIONS

This application is the National Stage of PCT/EP2011/000658 filed on Feb. 11, 2011, which claims priority under 35 U.S.C. §119 of GB Application No. 1002309.1 filed on Feb. 11, 2010, the disclosure of which is incorporated by reference. The international application under PCT article 21(2) was published in English.

The present invention relates to bearings particularly, though not exclusively, so-called small end bearings used to connect an internal combustion engine connecting rod to an associated piston.

Small end bearings are generally in the form of wrapped bimetal bushes being made from a bimetal material comprising a strong backing material such as steel and a bearing lining alloy, frequently of a copper-based material such as a tin-bronze, bonded thereto. Alternatively, but less frequently, such bearing bushes may sometimes be made by machining from monolithic material in the form of bronze tube, for example.

Unlike main bearings and big-end bearings in internal combustion engines which are provided with a continuous supply of lubricating oil under pressure and generate hydrodynamic oil lubrication films wherein the crankshaft or connecting rod is largely supported on such an oil film so that metal surfaces contacting each other are largely prevented; small end bushes rely mainly upon so-called splash lubrication where oil is thrown into the piston cavity by the rotating crankshaft, for example. Other methods such as forming an open ended oil access hole on the end of the connecting rod, the hole leading to the gudgeon pin/bush running surface interface have also been employed, for example. However the situation is that in general the running surface between the gudgeon pin and the small end bush operating surface receives only limited supplies of lubricating oil. The problem is exacerbated by the fact that relative movement is oscillatory rather than rotational as in the main and big end bearings and the lower surface of the small end bush is subjected to high firing loads which tends to squeeze out any lubricating oil and concentrate the load on a particular region of the bearing bush causing preferential wear.

According to the present invention there is provided a bearing bush wherein the bush bore at the axial ends of the bush is provided with relieved portions extending at least a part of the distance around a circumference of the bush, the relieved portions being in the form of grooves in the bore surface.

The bush may be in the form of a wrapped bush in that the bush is formed from an initially substantially flat blank comprising a strong backing material such as steel, for example, and having a lining of a bearing alloy such as a copper-based material thereon, for example. The required relieved portions may be formed by first embossing the flat blank or by conventional machining operations such as milling, for example.

Alternatively the bush may be machined from solid, monolithic material such as tube, for example, the relieved portions being formed during a machining procedure to form the bush.

The bush may be substantially right cylindrical in form or may be of tapered form when viewed from a direction normal to the bush axis with the wider part arranged in the connecting rod to receive the piston firing loads.

The purpose of the relieved groove portions is to catch and retain lubricating oil to improve the availability of oil to the bush bearing surface. The relieved groove portion act as oil reservoirs to help relieve potential problems such as seizure and scuffing. The oil may be supplied by splash feed from the rotating crankshaft during engine operation or by side-leakage from the bush itself, for example, as a result of oil being supplied to the bush via a drilling through the shank of the connecting rod, for example. It is preferred that the grooves formed in the axial ends of the bush retain an upstanding wall portion of the bush material axially outwardly of the main piston pin supporting bore and of the groove itself to act as a wall or weir to retain oil and preventing the oil from immediately flowing away. The bore diameter of any remaining upstanding portion axially outwardly of the grooves may be greater than that of the main piston pin supporting bore in order to allow relatively free access of oil into the grooves.

The upstanding wall portion retained at the bush edges may be reduced in height relative to the supporting bush bore so as to allow, in use, a gap between the top of the wall portion and the surface of the associated piston pin, for example, to allow for ingress of lubricating oil into the groove. The upstanding wall portions may be reduced in height either in the blank form before wrapping or in the wrapped bush after forming.

The upstanding portion axially outwardly of the oil retaining grooves may be formed in an eccentric manner with a greater gap between piston pin and edge of the upstanding portion at the top (when in service) reducing to a smaller gap or negligible gap at the bottom so as to retain the maximum amount of oil in the most desirable place.

In the case of the tapered type of bush the upstanding portions axially outwardly of the groove may only exist at the lower, wider part of the bush, since the tapering bush edges will allow relatively free oil access to the grooves at each axial end of the bush.

The grooves of the relieved portions may or may not extend through 360° of the bush circumference. Where the final wrapped bush is of the tapered type, the grooves may only be formed in the lower, wider portion thereof. However, even in the case of right circular cylindrical bushes the grooves may not extend through 360° and may be confined to that portion of the blank or bush which in use becomes the area or region subjected to the highest running loads.

The grooves of the relieved portions may extend only into the bearing lining layer or may alternatively extend through the bearing alloy lining and also into the strong backing material.

The oil retaining grooves formed at the bush ends may also connect with grooves formed in the bearing bush surface possibly extending fully along the axial length of the bearing bush.

In order that the present invention may be more fully understood, examples will now be described by way of illustration only with reference to the accompanying drawings, of which:

Figure 1:
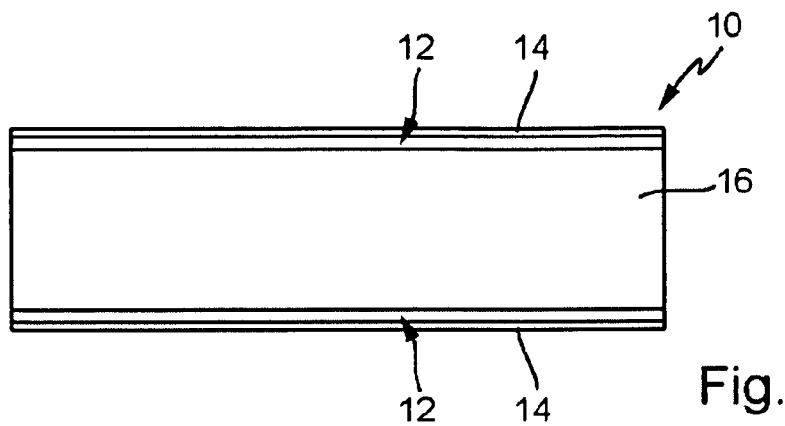
FIG. 1 shows a plan view of an unwrapped bush blank having grooves formed therein.

Referring now to the drawings and where the same features are denoted by common reference numerals.

FIG. 1 shows a plan view of a flat, unwrapped small end bush blank 10 having grooves 12 formed therein near the edges leaving upstanding wall portions 14 at the edges. The grooves 12 may be formed by any suitable technique such as embossing or machining, for example. The blank 10 may generally comprise a strong backing material 16 such as steel, for example, and having a lining thereon of a bearing material 18 such as a tin-bronze, for example (see FIG. 2). When wrapped to form a cylindrical small end bush 20 as shown in FIG. 2, part of the upstanding wall portions 14 are removed so as to allow a gap between the edge of the wall portion and the surface of a piston pin to allow oil to be collected in the groove 12.

Figure 2:
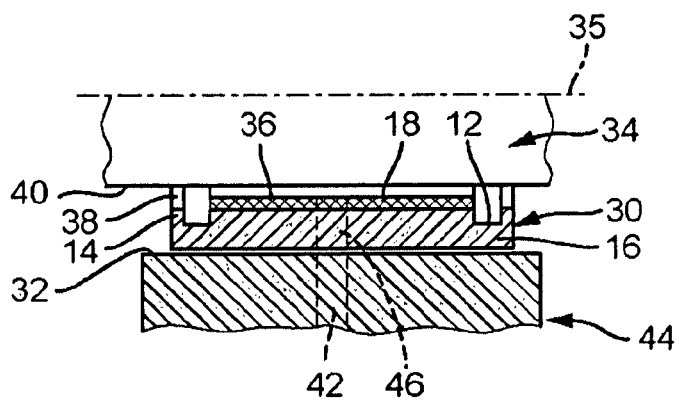
FIG. 2 shows a part-cross section through a piston pin, small end bush and small end assembly, the small end bush being according to the present invention and formed from a blank of the type shown in FIG. 1.

Referring now to FIG. 2 which shows a part cross section of small end bush 30 formed from a blank such as that shown in FIG. 1 installed in the small end eye 32 of a connecting rod and having a piston pin 34 having an axis 35 inserted through the bore 36 of the bush 30. As noted above, part of the upstanding wall portions 14 are removed so as to create a gap 38 between the piston pin surface 40 and the upstanding wall portion 14 to allow ingress of oil (not shown) by splash into the grooves 12.

In an alternative embodiment an oil supply hole 42 (shown as dashed lines in FIG. 2) may be provided in the connecting rod shank 44, the oil supply hole 42 mating with a corresponding oil hole 46 (shown as dashed lines in the bush 30 in FIG. 2) in the bush. The oil supply from the shank drilling 42 will be forced in an axial direction out of the bush during engine operation some of which will be retained in the grooves 12 of the bush to provide an oil reservoir.

FIGS. 3A to 3D show sketches of cross sections of alternative groove forms in small end bushes according to the present invention.

Figure 3A:
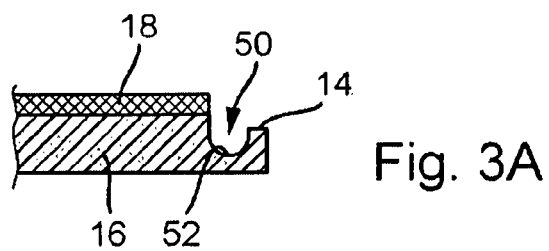
FIGS. 3A to 3D show cross sections of ends of small end bushes according to the present invention having alternative groove forms.

FIG. 3A shows an example of a groove 50 where the bearing lining material 18 has been removed so as to leave the groove 50 with an upstanding wall portion 14 comprising only the strong backing material 16. The groove cross sectional shape is essentially circular at the base 52 thereof.

Figure 3B:
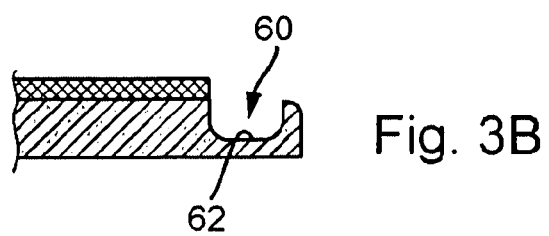

FIG. 3B shows an alternative shape of groove 60 wherein the cross sectional shape tends to a rectangular shape 62 providing a greater oil volume capacity.

Figure 3C:
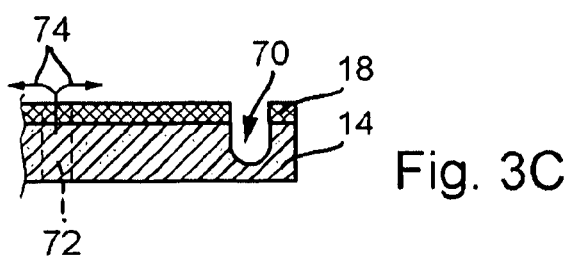

FIG. 3C shows an arrangement wherein the groove 70 is formed in the bush leaving the bearing lining material 18 in place on the upstanding wall portion 14 thus providing in effect a sealed groove to retain oil more securely. In this embodiment an oil hole 72 is formed in the bush and which is supplied with oil via a drilling in the connecting rod shank (as shown in the alternative embodiment described above with respect to FIG. 2), the oil spreading in both directions axially as indicated by the arrows 74.

Figure 5:
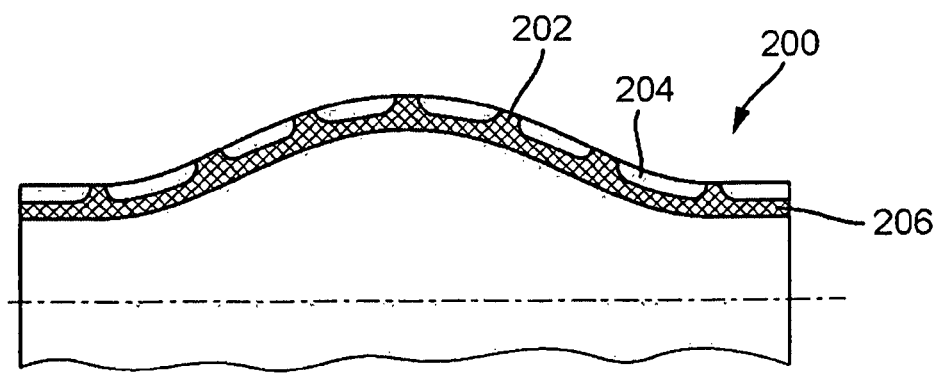
FIG. 5 shows a similar view to that of FIG. 4 but having an alternative groove form.

In a modification of the embodiment of the small end bush of FIG. 3C, the oil hole 72 may be omitted (in the case where the connecting rod has no oil supply drilling in the shank) and gaps such as are shown in FIG. 5 described below or having the groove arrangement of FIG. 8 described below.

Figure 3D:
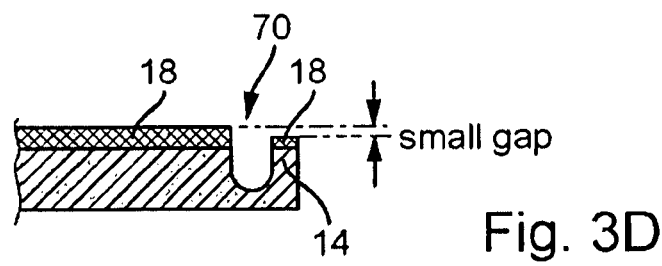

FIG. 3D shows a variation on the embodiment of FIG. 3C in which the top surface of the bearing lining material 18 on the upstanding wall portion 14 is slightly lower than the surface of the bearing lining material 18 on the main part of the bearing. In other words, the small land at the edge of the bearing is lightly below the running surface. This may help to retain oil and may also reduce potential manufacturing problems related to fabrication of the small width.

Figure 4:
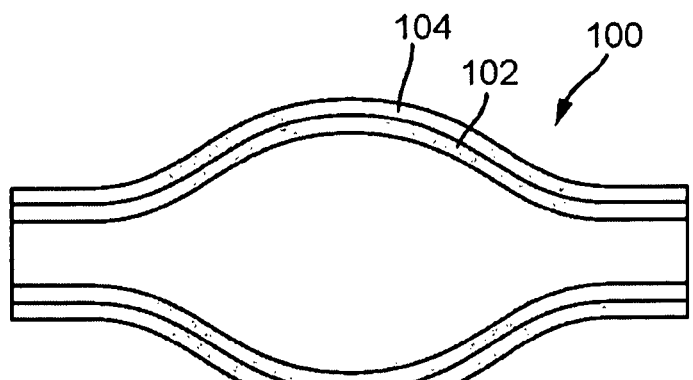
FIG. 4 shows a plan view of an unwrapped bush for forming into a tapered small end bush

FIG. 4 shows a plan view of a blank 100 for forming a tapered small end bush after wrapping. The edges of the blank also comprise the oil retaining grooves 102 and upstanding wall portions 104 axially outwardly of the grooves after wrapping. The wall portions may be reduced in height as with the wall portions 14 shown in FIGS. 1, 2 and 3 so as to leave a gap between the top of the wall portion and the associated piston pin surface.

FIG. 5 shows a plan view of part of a blank 200 similar to that of FIG. 4 but having gaps 202 formed in the upstanding wall portions 204 so as to allow easier access of oil into the grooves 206. The remaining upstanding wall portions 208 prevent the oil from flowing away immediately and generally act to preserve an oil supply at the bush edges for supplying to the working surface between the bush bore and the piston pin surface.

Figure 6:
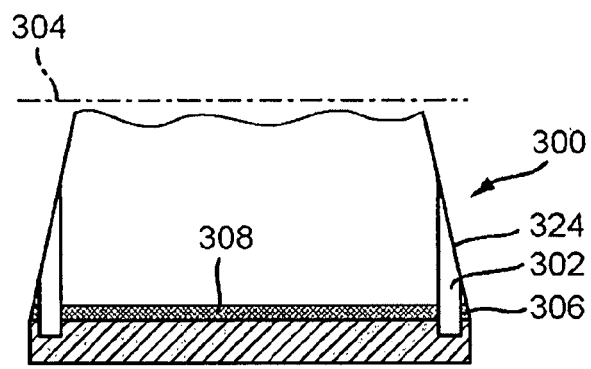
FIG. 6 shows a cross section through the lower, wider load bearing part of a wrapped tapered small end bush according to the present invention having a further alternative groove arrangement.
Figure 7:
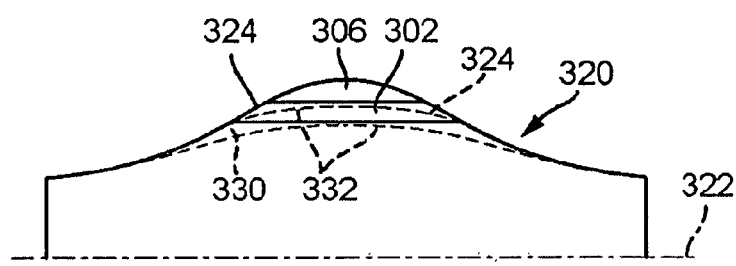
FIG. 7 shows a plan view of a blank from which the embodiment of FIG. 6 may be formed.

FIG. 6 shows the lower, wider more heavily loaded portion of a wrapped tapered bush 300. In this embodiment oil retaining grooves 302 are formed in the bush ends to be generally vertical to the bush axis 304. The upstanding wall portions 306 are not reduced in height and may have a bore diameter over the circumference through which they extend substantially the same as that of the main load supporting bore 308. FIG. 7 shows a plan view of a blank 320 from which the bush 300 of FIG. 6 may be formed. The grooves 302 are formed substantially parallel to the longitudinal axis 322 of the blank. When wrapped into tapered bush the gaps 324 accessing the blank edge are raised relative to the lower bearing surface 310 and the grooves 302 provide arcuate troughs in which to receive and hold oil. Depending upon the distance into the blank 320 that the groove 302 is formed the circumferential extent of the oil retaining troughs may be varied.

Alternatively to the straight grooves 302 in the blank 320 the grooves may be formed in a curved form similar to those shown in FIG. 4 but with the grooves breaking through the upstanding wall portion as indicated by the groove 330 denoted by the dashed lines 332 in FIG. 7. This would permit a longer oil retaining groove holding a greater quantity of oil due to the upstanding wall portions being of the same bore diameter as the main bush bore.

Figure 8:
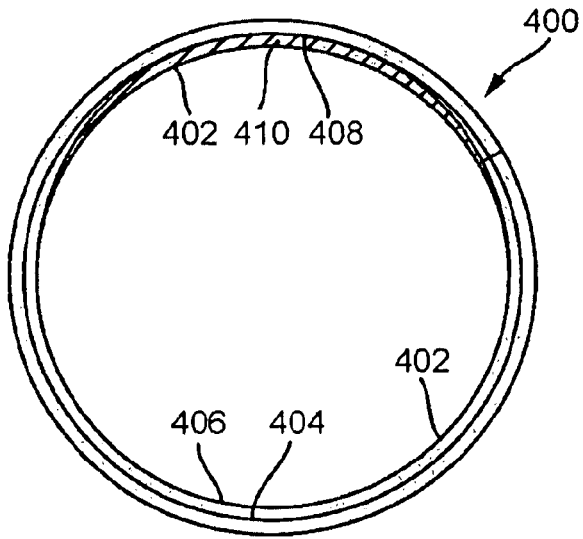
FIG. 8 shows an end view of a wrapped bush.

FIG. 8 shows and end view of a wrapped bush 400. The main load supporting bore of the bush is denoted at 402 and the oil retaining groove at 404. In this embodiment the diameter of the upstanding wall portion 406 is substantially that of the main bore 402 at the lower (in use) part of the bush. However, the upper portion 408 of the upstanding wall portion is removed in an eccentric manner (shown as the hatched portion 410 in FIG. 8) to provide an oil entry gap in order to receive and retain the maximum amount of oil in the groove 404 at the lower, maximum load supporting area of the bush.

Figure 9:
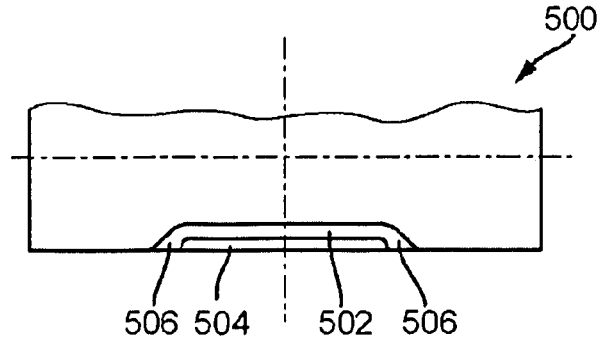
FIG. 9 shows a plan view of a rectangular blank for the subsequent production of a parallel sided cylindrical bush.

FIG. 9 shows a rectangular blank 500 for the subsequent production of a parallel sided cylindrical wrapped bush. The blank 500 has an embossed groove 502 and a consequent retaining wall portion 504 and oil entry ports 506 breaking through the retaining wall 504 to allow oil capture in the groove 502 when the wrapped bush is in operation.

As will be appreciated by those skilled in the art, the shapes and configurations of oil retaining grooves described and illustrated in the embodiments are not exhaustive and are only exemplary and many other shapes a configurations may be formed within the scope of the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A bearing bush wherein the bush bore adjacent the axial ends of the bush is provided with relieved portions extending at least a part of the distance around a circumference of the bush, the relieved portions being in the form of grooves in the bore surface, wherein there are upstanding wall portions intermediate the relieved portions and the bush axial ends, and wherein the upstanding wall portions are relieved in height eccentrically relative to a main load supporting bore surface.

2. The bearing bush according to claim 1 wherein the bush is a wrapped bush formed from a pre-cursor blank.

3. The bearing bush according to claim 2 wherein the relieved portions are formed in the pre-cursor blank.

4. The bearing bush according to claim 3 wherein the relieved portions are formed by embossing into the pre-cursor blank.

5. The bearing bush according to claim 3 wherein the relieved portions are formed in the pre-cursor blank by machining.

6. The bearing bush according to claim 1 wherein the upstanding wall portions extend only partially around the bush circumference.

7. The bearing bush according to claim 1 wherein an internal diameter of the upstanding wall portion is greater than that of a main load supporting bore of the bush.

8. The bearing bush according to claim 1 wherein the bearing bush comprises a strong backing material and a lining of a bearing material bonded thereto.

9. The bearing bush according to claim 8 wherein the relieved portions extend into the bearing material lining.

10. The bearing bush according to claim 8 wherein the relieved portions extend through the bearing material lining into the strong backing material.

11. The bearing bush according to claim 1 wherein the bearing bush is a tapered bush.

12. The bearing bush according to claim 1 wherein gaps are provided in the upstanding wall portions.

13. The bearing bush according to claim 1 wherein the relieved portions break through the upstanding wall portions to provide oil access ports thereto.

14. The bearing bush according to claim 1 wherein the bearing bush is made from monolithic material.

* * * * *